Feb. 20, 1934.    H. C. H. WALSH ET AL    1,947,892
POWER PRESS CONTROL
Filed Dec. 26, 1931    3 Sheets-Sheet 1

Inventors.
Harry C. H. Walsh and
Edward H. Hall
By Banning & Banning
Attys.

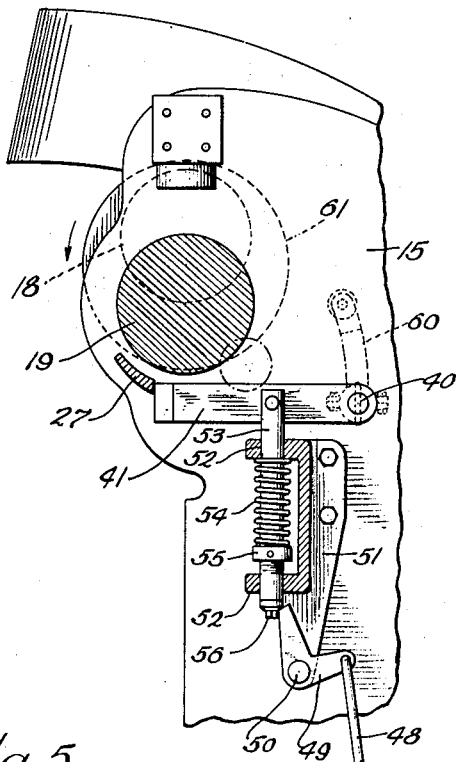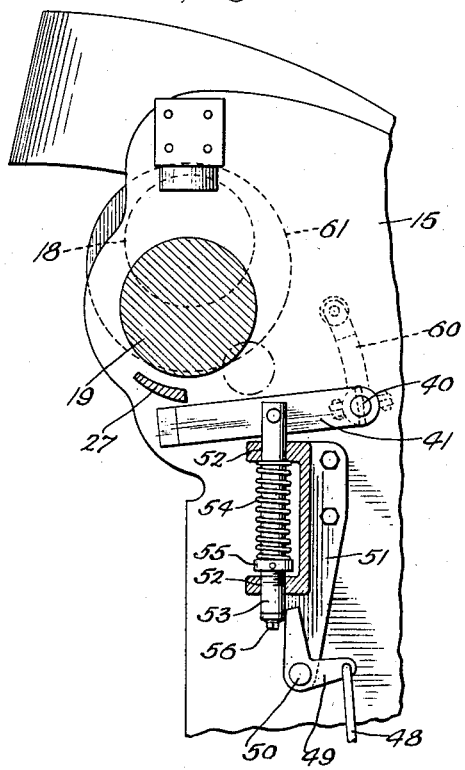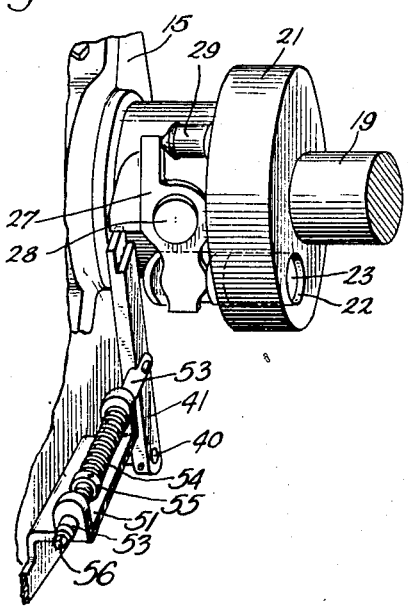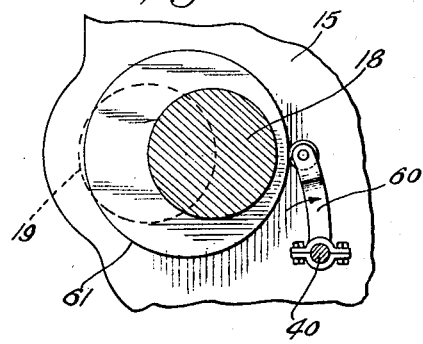

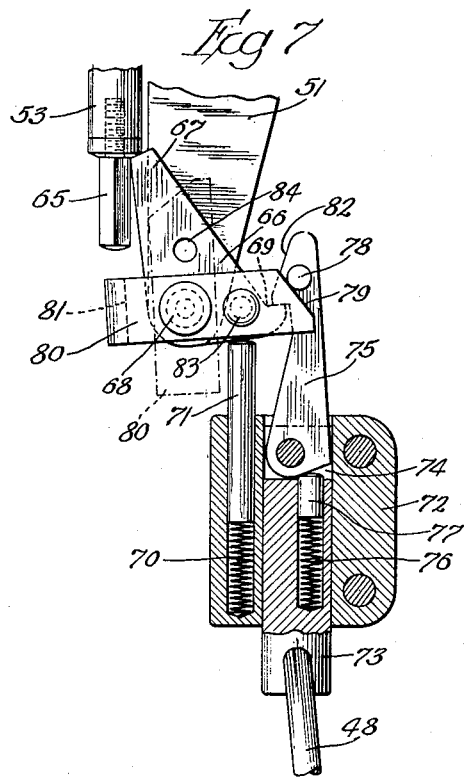
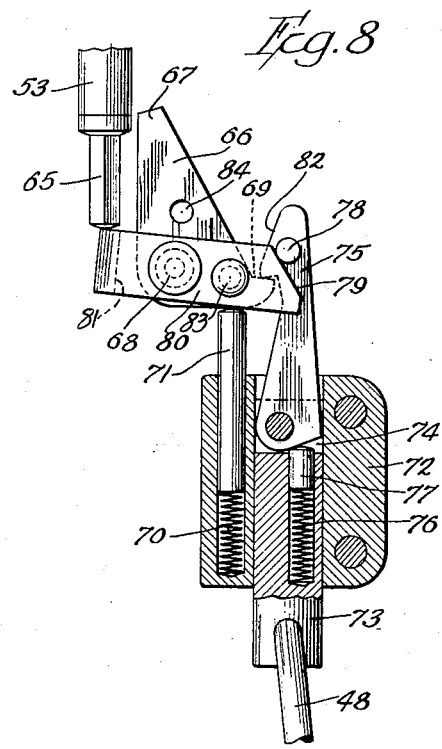
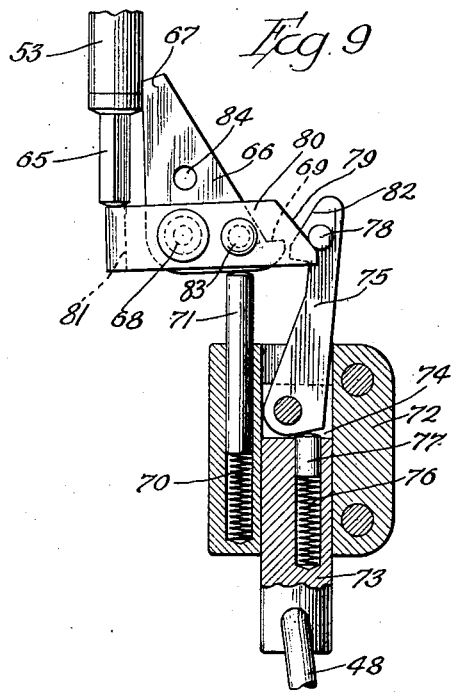
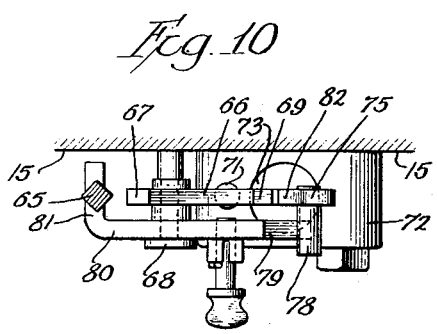

Patented Feb. 20, 1934

1,947,892

UNITED STATES PATENT OFFICE 1,947,892

POWER PRESS CONTROL

Harry C. H. Walsh and Edward H. Hall, Chicago, Ill.

Application December 26, 1931
Serial No. 583,232

7 Claims. (Cl. 192—17)

This invention relates generally to power presses of the kind which utilizes a hand or foot lever control for actuating certain clutch and brake mechanism by which to govern the operating movements of the press, and more particularly the present improvements are directed to the construction of means for actuating the latch for operating the clutch bolt to and from engagement with a power fly wheel, and the co-ordinated operation thereof as controlled by the operator.

The features of the present invention are particularly adaptable to the construction shown in Patent No. 1,928,711, dated October 3, 1933, wherein is shown a releasable brake mechanism operable in conjunction with the latch. More specifically, the present device has to do with a mechanism whereby the operator engages the clutch bolt by means other than direct mechanical connection, and the clutch bolt is withdrawn by a positive cam action.

As an exemplification of our invention, reference is made to the accompanying drawings in which—

Fig. 3 is an enlarged sectional view, taken on line 3 of Fig. 1;

Fig. 4 is a view similar to Fig. 3, but showing the latch in a moved position permitting engagement of the clutch bolt with the fly wheel;

Fig. 5 is a perspective view of the clutch mechanism, as viewed from below, showing the clutch bolt withdrawn from contact with the fly wheel (not shown);

Fig. 6 is a fragmentary sectional view taken on the line 6 of Fig. 1 showing the crank shaft rotated 270° from that shown in Fig. 1;

Fig. 7 is a modified form of latch mechanism, shown partly in section and partly in elevation;

Fig. 8 is a view similar to Fig. 7 with the parts moved slightly from the positon shown therein;

Fig. 9 is a view similar to Fig. 7 with the parts moved further than shown in Fig. 8; and Fig. 10 is a plan view of the latch mechanism, the end of the thrust rod being shown in section.

Figure 1:
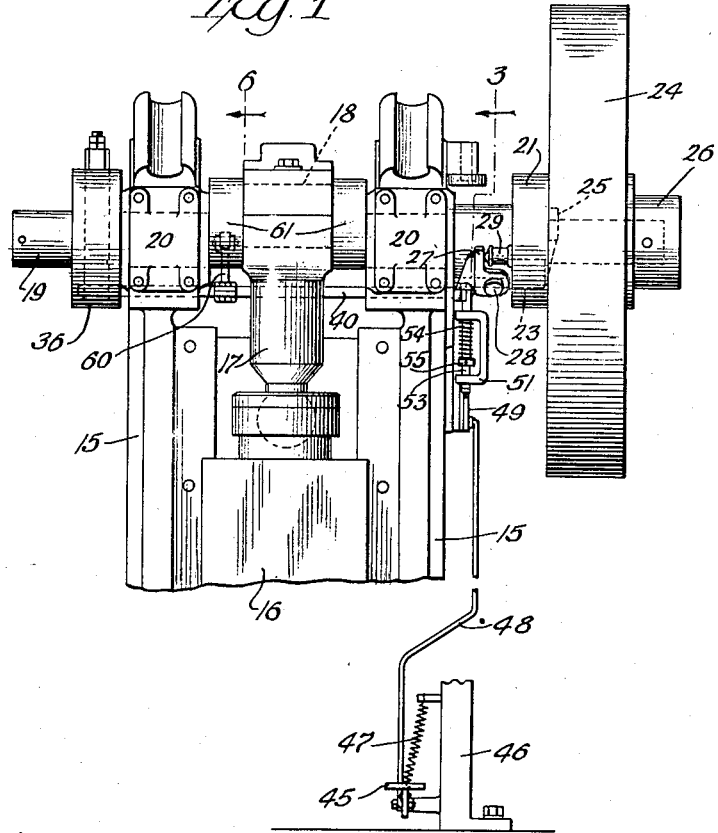
Figure 1 is a fragmentary view showing in front elevation the upper portion of a press, and a portion of one leg to which is pivotally connected an operating treadle.
Figure 2:
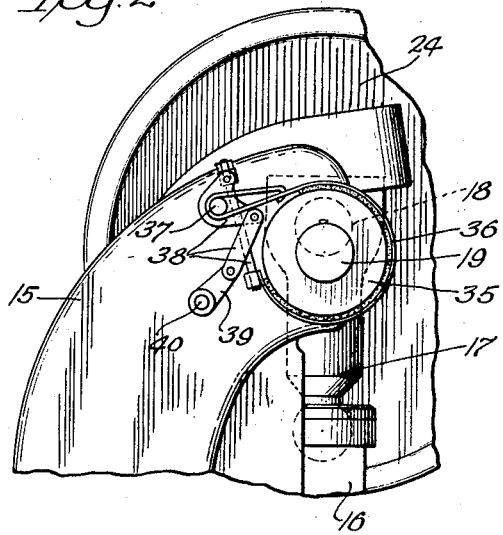
Fig. 2 is a side elevation showing the brake mechanism.

The press may be of usual construction in that it comprises a base (not shown) from which upstand standards 15, upon which is slidably mounted a head 16 which carries the die or other tool employed by the press. The sliding head is actuated by a pitman 17 which is connected at its lower end by a ball and socket joint with the head, and is connected at its upper end to the cranked portion 18 of a crank shaft 19, which is carried in suitable journal mountings 20 formed at the upperside ends of the standards.

At a point outside of the standard, and formed on the crank shaft, is a clutch head 21 having an opening 22 in axial alignment therewith in which is slidably mounted a clutch bolt 23. A driving element, such as a fly wheel 24, having recesses 25 in the face of its hub, is mounted on the shaft adjacent the clutch head, and held thereon by a cap 26 secured to the shaft end. The clutch bolt is moved into and out of engagement with the fly wheel by a bell crank 27 pivotally secured to the crank shaft, as by a pin 28. By means of an enclosed spring 29 the bell crank normally urges the clutch bolt into engagement with the fly wheel.

The opposite end of the crank shaft is provided with a brake mechanism which may include a drum 35 rigidly secured to the shaft. About the drum is a flexible band 36, one end of which is secured to a stationary lug 37 projecting from the standard. The free end of the band may be connected by suitable lever mechanism 38 to an arm 39 which is secured to a rock shaft 40 mounted in the standards and extending therethrough to the opposite side of the press where a latch 41 is rigidly secured thereto. The latch is movable to a position shown in Fig. 3 for engaging the bell crank 27 whereupon the clutch bolt is withdrawn from the fly wheel, and the crank shaft ceases to rotate. The latch is also movable to a position shown in Fig. 4 whereupon the clutch bolt is advanced by the enclosed spring 29 so as to engage the fly wheel, and the rock shaft is slightly rotated to release the brake band from the brake drum so that the crank shaft is freely rotatable, particularly at the start of its rotation.

An operating treadle 45 is pivoted at one end to a leg 46 which supports the press, the treadle being normally urged upward by a spring 47. A rod 48 connects the treadle with one end of a bell crank 49 which is pivotally connected at 50 to a bracket 51. The bracket, which is secured to the standard, may be provided with spaced bearings 52 in which is slidably mounted a thrust rod 53 pivotally connected at one end to the latch 41. The thrust rod is normally urged to the position shown in Fig. 4 by a spring 54 which may be interposed between one of the bearings 52 and a sleeve 55 adjustably secured to the thrust rod. The thrust rod is mounted in alignment with the bell crank 49 whereby one arm thereof may abut the end of the thrust rod to hold the latch in a position so that the press is inoperative. The thrust rod may be provided with a stop 56 to prevent excessive rocking movement of the bell crank.

The thrust rod is moved upward against the tension of the spring by a roller arm 60 which is secured to the rock shaft and in alignment with one of the cheeks 61 of the crank shaft. Referring to Fig. 6, it will be seen that as the cheek moves about the crank shaft center it contacts with the roller arm to rotate the rock shaft 40 which returns the latch to the position shown in Fig. 3, the latter being held in that position by the bell crank 49 until the operator again moves the treadle.

The punch press, as above described, is operated in the following manner. With the clutch parts in normal position, as viewed in Fig. 3, the treadle is depressed moving the free arm of the bell crank 49 from beneath the thrust rod, whereupon the thrust rod is moved downward by the spring 54 to the position shown in Fig. 4. As the thrust rod is forced downward the latch is withdrawn from contact with the bell crank 27, permitting the bell crank to effect engagement of the clutch bolt with the fly wheel. When the latch is moved downward the rock shaft is rotated to disengage the brake mechanism from the crank shaft, and moves the roller arm 60 to a position in the path of the cheek 61.

When the crank shaft has rotated substantially 270° the cheek engages the roller arm, as shown in Fig. 6, to turn the same in a clockwise direction to apply the brake mechanism and to raise the latch and thrust rod against the tension of the spring 54. At this point in the operation, the operator will have removed his foot from the treadle so as to permit the bell crank 49 to move beneath the thrust rod and retain the same in its uppermost position.

It will be noted that very little movement and pressure of the treadle is required to operate the press, as it is only necessary for the operator to move the bell crank from beneath the thrust rod. Furthermore, the present device is advantageous in that it is rendered inoperative in case the spring 54 is broken. Heretofore, if the spring for moving the latch broke, the press would operate continuously until the power was shut off. When this occurs the dies are usually damaged and accidents are caused in this manner. In the present device, if the spring breaks, the thrust rod will remain in position upon actuation of the treadle, due to the pressure exerted by the bell crank 27 upon the latch. However, if the latch should be released, the punch would be stopped by the roller arm which automatically disengages the clutch bolt.

The above described device embodies all the advantages of the ordinary punch presses, and the operator's movement for actuating the press is substantially the same. However, less effort is required by the operator and the possibility of accident is greatly reduced.

With the ordinary press it is possible to operate the press repeatedly by holding the treadle down. This is advantageous when punchings are made from a long strip of material. The same repeated punching may be accomplished with the present device and in the same manner. That is, by holding the treadle down, in which case the latch is raised by the roller arm to engage the bell crank 27, but is lowered again before engagement takes place.

Accidents have occurred to operators failing to remove their foot from the treadle after once depressing it, or because the treadle was not released sufficiently to effect disengagement of the clutch bolt. To overcome this hazard, provision is made in a modified form, shown in Figs. 7 to 10 inclusive, in which the thrust rod 53 is provided with an extension 65. A bell crank 66 having an arm 67 for abutting the end of the thrust rod in the same manner as above described, is pivotally mounted at 68 to the bracket 51. The bell crank is provided on its other arm with a shoulder 69 for a purpose presently to be described. The bell crank is always urged in a counterclockwise direction by a spring 70 and pin 71 which is seated in a block 72 secured, as by bolts, to the standard.

Slidably fitted in the block is a reciprocating rod 73 having one end secured to the treadle rod 48, and the other end bifurcated at 74 to receive a pawl 75. The pawl is urged toward the bell crank by a spring 76 and pin 77. The pawl is provided with a pin 78 adapted to be engaged by an angular surface 79 of a knock-off bar 80 which is pivotally mounted at 68 and bent at 81 so as to lie beneath the extension 65.

With the parts in normal inoperative position, as shown in Fig. 7, the operator presses the treadle pulling down on the treadle rod which in turn pulls the pawl which engages the shoulder of the bell crank 66. The bell crank is thus rocked so that the arm 67 disengages the thrust rod which is forced downward by the spring 54, as previously described. As the thrust rod is lowered the extension 65 contacts with the knock-off bar, as shown in Fig. 8, which is rocked in a manner to disengage the pawl from the shoulder on the bell crank, as is shown in Fig. 9. The bell crank is forced against the thrust rod by the spring 70 so as to engage the end thereof when it is moved up by the roller arm 60.

In the event that the treadle is held down until the cycle of operation has been completed, the angular surface 82 on the pawl rides against the bell crank adjacent the shoulder 69 as the operator releases the treadle, and finally engages the shoulder in readiness for the next operation. If desired, the knock-off bar may be turned to vertical position, as indicated by broken lines (Fig. 7) to render it inoperative, in which case the operation is much the same as described in connection with the preferred form. The knock-off bar may be locked in inoperative position by a spring bolt 83 which may be inserted in the opening 84 in the bell crank.

We claim:

1. In a punch press having a crank shaft to which is connected a reciprocating head, and having a driving element rotatable on the shaft, a clutch bolt movably carried by the shaft adapted to establish a driving connection with the driving element, means for advancing the clutch bolt to engaged position with the driving element a rock shaft, a latch keyed at one end to the rock shaft and having its free end movable toward and away from a position for disengaging the clutch bolt, a spring for moving the latch to a position whereby the clutch bolt may be advanced, and means secured to the rock shaft and operated by the crank shaft for moving the latch to a position for withdrawing the clutch bolt.

2. In a punch press having a body mounting, a crank shaft to which is connected a reciprocating head, and having a driving element rotatable on the shaft, a clutch bolt movably carried by the shaft adapted to establish a driving connection with the driving element, means for advancing the clutch bolt to engaged position with the driving element, a latch for disengaging the clutch bolt, a rock shaft rigidly connected to the latch and having bearings in the press body, a spring for moving the latch to a position whereby the clutch bolt is advanced, and a roller arm on the rock shaft adapted to engage the crank shaft and move the latch to a position for withdrawing the clutch bolt.

3. In a punch press having a crank shaft journaled in a standard, a driving element rotatable on the shaft, clutch mechanism on the crank shaft for effecting driving connection with the driving element, a rock shaft journaled in the standard, a latch secured to the rock shaft and having its free end abutting the clutch mechanism to render it inoperative, a spring normally tending to rock the latch in a direction away from the clutch mechanism so that the latter becomes operative, a roller arm secured to the rock shaft and adapted to engage a cheek on the crank shaft whereby the latch is moved to a position to disengage the clutch, and means for releasably securing the latch in the last named position.

4. In a punch press having a crank shaft journaled in a standard, a driving element rotatable on the shaft, clutch mechanism on the crank shaft for effecting driving connection with the driving element, a rock shaft journaled in the standard, a latch secured to the rock shaft and having its free end abutting the clutch mechanism to render it inoperative, a thrust rod pivotally connected to the latch, a spring normally tending to move the thrust rod in a direction to release the latch from the clutch mechanism, means actuated by the crank shaft for moving the latch against the tension of the spring and to contact the clutch mechanism whereby the latter is rendered inoperative, a bell crank adapted to abut the thrust rod to hold the latch in contact with the clutch, and a treadle for moving the bell crank out of the path of the thrust rod whereby the latch is moved from the clutch by the tension of the spring.

5. In a punch press having a crank shaft journaled in a standard, a driving element, clutch mechanism for effecting driving connection between the driving element and the crank shaft, a latch, a spring for moving the latch out of engagement with the clutch whereby the latter effects driving connection, means for moving the latch into engagement with the clutch to disconnect the same, abutting means for holding the latch in the last named position, a pawl for engaging the abutting means to move the same out of abutting relation, means for disengaging the pawl from the abutting means after the latch has been moved out of engagement with the clutch, and a treadle for operating the pawl.

6. In a punch press having a crank shaft journaled in a standard, a driving element, clutch mechanism for effecting driving connection between the driving element and the crank shaft, a latch for operating the clutch, brake mechanism tending to hold the shaft against rotation, a rock shaft connected to the brake mechanism and the latch to move them simultaneously, a spring for moving the latch to effect driving connection between the crank shaft and driving element and release the brake mechanism from the crank shaft, and means operable by the crank shaft for moving the rock shaft whereby the brake is applied and the clutch is released.

7. In a punch press mounting a crank shaft, a driving element, and clutch mechanism for effecting driving connection therebetween, a latch withdrawable from the clutch mechanism for effecting driving connection with the driving element, means operated by the crank shaft for restoring the latch with each rotation of the crank shaft, releasable means for maintaining the latch in its restored position, and a pawl for moving said releasable means and permitting the latch to withdraw from the clutch mechanism whereby driving connection is made between the crank shaft and driving element.

HARRY C. H. WALSH.
EDWARD H. HALL.